April 27, 1954   J. R. HAYNES ET AL   2,677,106
TESTING OF SEMICONDUCTORS
Filed Dec. 2, 1950   2 Sheets-Sheet 1

INVENTORS: *J. R. HAYNES*
*J. A. MORTON*
BY
*N. S. Ewing*
ATTORNEY

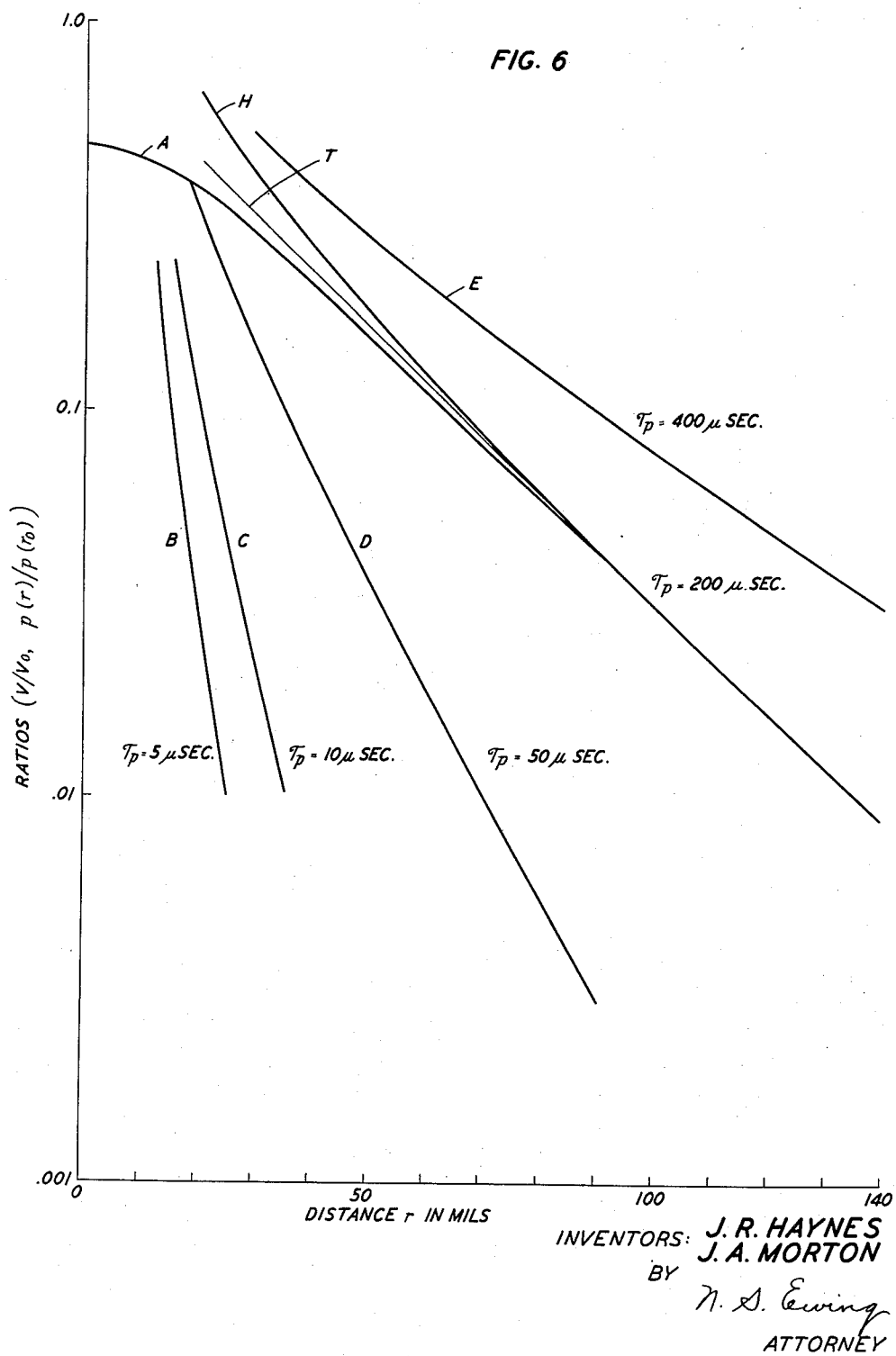

UNITED STATES PATENT OFFICE 2,677,106

TESTING OF SEMICONDUCTORS

James R. Haynes, Chatham, and Jack A. Morton, Neshanic Station, N. J., assignors to Bell Telephone Laboratories, Incorporated, New York, N. Y., a corporation of New York Application December 2, 1950, Serial No. 198,864

9 Claims. (Cl. 324—158)

This invention relates to the electrical testing of bodies of semiconductive material.

An object of the invention is to facilitate the manufacture of transistors and other semiconductor translating devices and, more particularly, to enable the manufacturer to determine readily whether or not, or to what extent, a given ingot, crystal or other body of semiconductive material, such as germanium or silicon, has electrical properties desired in such devices. A related object is to enable one to cull out unsuitable or inferior ingots or the like and thereby to avoid waste in the time-consuming and costly cutting and grinding operations involved in subdividing an ingot into the minute plates and filaments usually desired for translating devices.

The operation of various semiconductor translating devices is commonly explained in terms of mobile charge carriers, viz., holes and excess electrons, that are created within the semiconductor at the place or places where the device is appropriately excited by an external energy source. The holes and electrons (which represent mobile charges of positive and negative sign, respectively,) tend, however, to recombine with each other and so to disappear in a relatively short time that is of the order of microseconds and that may be as much as hundreds of microseconds. The rate of recombination, or average lifetime, of such mobile charges is an important factor in the operation of semiconductor devices; it is determined in part by an intrinsic property of the semiconductive material itself, and in part by the proximity and character of the surface of the semiconductor.

A further and more specific object of the invention is to enable the comparison of semiconductor bodies with respect to electron- or hole-lifetime, and the grading of such bodies with respect to the above-mentioned intrinsic property, viz., "intrinsic lifetime."

The present invention contemplates the generation of mobile charge carriers at a first point in the semiconductor body to be tested under conditions such that the charge carriers are free to diffuse undisturbed through the body, efficient detection of the charge carriers at a second point separated from the first, and measurement of the effect of varying the distance between the two points on the density of charge carriers at the second point. The invention is featured, in part, by the use of a beam of radiant energy, and specifically an amplitude-modulated beam of light, to generate the charge carriers, and by movement of the beam to vary the distance over which the carriers diffuse before they reach the detection point. Another feature of the invention resides in preparation of a surface of the semiconductive body to be tested so as to reduce the rate of recombination of holes and electrons at the surface, i. e., to increase the "surface lifetime," whereby a readier and more accurate determination can be made of the rate of recombination within the mass at a distance from the surface.

The nature of the present invention and its various features and objectives will appear more fully upon consideration of the specific embodiments illustrated in the accompanying drawings and hereinafter to be described.

Fig. 6 comprises explanatory curve diagrams.

Figure 1:
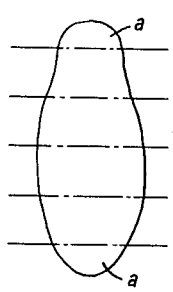
Fig. 1 illustrates a typical ingot of semiconductive material with longitudinal axis and sectioning planes indicated thereon.

Referring more particularly now to Fig. 1, there is shown a typical ingot of germanium which may be, for specific example, three inches long and of roughly circular cross-section having an average diameter of about one-half to one inch. In the manufacture of translating devices from such an ingot the end portions $a$ are ordinarily removed and discarded inasmuch as the properties of those portions are likely to differ widely from those of the bulk of the ingot. The ingot is then sawed into slices about 0.020 to 0.040 inch thick and these are in turn cut into minute plates or filaments which are then commonly subjected to special surface treatment and assembled into translating devices. The devices on being tested, however, may be found to vary widely in performance, some or all of those derived from a particular ingot being perhaps inferior or completely unsatisfactory because of intrinsic properties of the material.

In the practice of the invention, it may be found that each of the ingots in any given run, i. e. those from a given melt, is fairly homogeneous with respect to intrinsic lifetime and that a single test of each will enable the ingots to be graded according to intrinsic lifetime. If the ingots are not homogeneous, each may be cut transversely of the axis as indicated by the section lines in Fig. 1, into several large blocks and these blocks then tested, for we find that the intrinsic lifetime of such an ingot varies gradually both radially and longitudinally in the ingot. In manufacturing operations, too, it will ordinarily be of less importance to obtain an absolute measure of lifetime than to obtain a test result indicating the relative intrinsic lifetime of a particular ingot or part thereof or whether, in respect of lifetime, the particular test part meets a predetermined reference standard or falls within predetermined limits.

Figure 2:
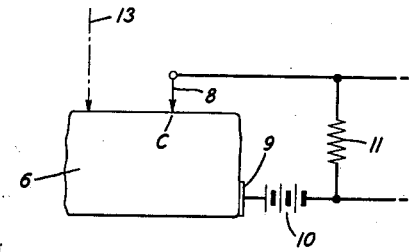
Figs. 2, 3 and 4 show diagrammatically an arrangement suitable for practice of the invention.
Figure 3:
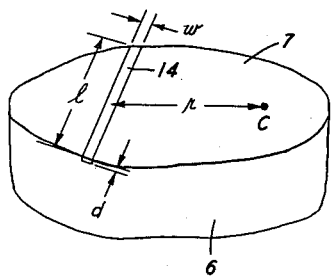
Figure 4:
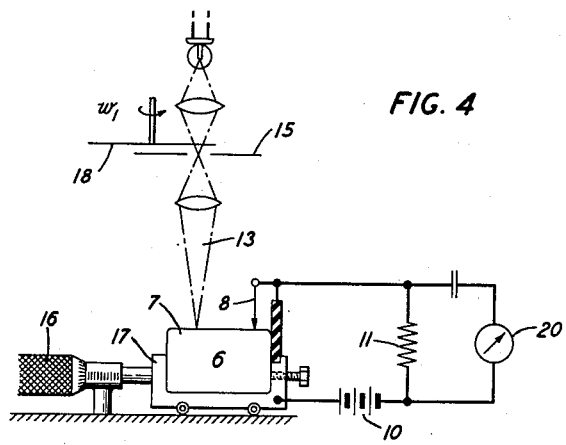

Figs. 2 to 4 illustrate a specific testing arrangement in accordance with the invention. There is represented at 6 an ingot of germanium, or one of the described larger subdivisions thereof, of which one of the end faces, 7, has been ground flat, polished and treated in a manner to be described. At 8 is shown a collector electrode comprising a wire, or cat whisker, the end of which rests on the surface 7 and makes a rectifying point contact therewith at C in a manner well-known in the art. This point contact may be electrically "formed" to increase its sensitivity as a collector in the manner set forth in the application of W. G. Pfann, Serial No. 68,596 filed December 31, 1948. A base electrode 9 makes a low-resistance contact with the lateral surface of the test piece; and an electrical circuit is completed between the two electrodes through a biasing battery 10 and a resistor 11. The contact 9 may be provided by a chuck or carriage 17 in which the test piece is clamped as shown in Fig. 4.

The battery 10 is poled in the so-called reverse direction, i. e., in the direction opposite to that of easy current flow through the point rectifier contact.

It will be assumed for specific example that the germanium is of n-type, in which case the collector electrode 8 has a negative bias as shown and the mobile charge carriers of interest are holes. A beam of light, indicated at 13 and shaped by a slit 15 is directed perpendicularly against the surface 7 to illuminate a narrow strip 14 (Fig. 3) thereof that is disposed symmetrically with relation to collector contact point C a small distance $r$ therefrom. The distance $r$ is made adjustable by providing, for relative movement of light beam and test piece as, for example, by making the carriage 17 movable perpendicularly to the length of the strip 14 as shown in Fig. 4. A micrometer drive for the carriage is indicated at 16.

Under the conditions described the light beam generates hole-electron pairs at the surface 7 and to some small depth into the body, and the holes diffuse in all directions through the body, becoming less and less concentrated at greater distances from the illuminated portion of the surface. Some of the holes reach electrode 8 and give rise to an increment of current in the external circuit which can be measured by measuring the increment of voltage drop across resistor 11. A certain steady voltage drop appears across resistor 11, even in the absence of the light beam, due to the steady biasing current that flows in the collector circuit. This constant voltage is excluded from consideration by modulating the light beam at a low-frequency $\omega_1$ of the order of 20 cycles per second, for example, as by means of the light chopper 18 in Fig. 4, and by employing an alternate current voltmeter 20 or equivalent device responsive only to the alternating voltage across resistor 11.

The invention purposes to obtain a measure of the intrinsic hole-lifetime of the test piece from a determination of the manner in which the density of holes varies with distance along the surface 7 from their place of origin. It will be understood that in Fig. 4 the change in voltage drop across resistor 11 due to the arrival of holes generated by the light beam affords a measure of the hole density at a fixed point, namely, the point C immediately under the collector electrode, and that the variation in the distance $r$ of this point from the place of origin of the holes can be effected by shifting the position of the light beam toward or away from the point C.

As the holes diffuse, recombination is continuously taking place so that the holes are of limited average lifetime $\tau_p$. The tendency of the surface 7, however, is to accelerate recombination of holes that come within its influence and hence, not only to promote non-uniform diffusion of the holes, but also to make the rate at which hole density decreases with distance along the surface from the generating point greater than the rate of density decrease in other directions through the body. For the purposes of the present invention the surface 7 is treated to reduce substantially the tendency of the surface to accelerate recombination and to eliminate it as nearly as possible. If the surface 7 did not produce any recombination it would reflect holes back into the body of the test piece just as if the latter were infinite in extent, and the diffusion pattern along the surface would be more simply and directly related to the intrinsic lifetime of the material. The practical effect of so reducing surface recombination is to increase the accuracy of measurement of intrinsic lifetime, to extend the range of conditions under which the invention may be applied, and to simplify the procedure involved in obtaining satisfactory approximate measurements.

One suitable method of treating the surface, involving the application of antimony oxychloride, is disclosed in application for United States patent Serial No. 175,648 filed July 24, 1950, by J. R. Haynes and R. D. Heidenrich and also in an article entitled "The Mobility and Life of Injected Holes and Electrons in Germanium" by J. R. Haynes and W. Shockley, 81 Physical Review 835, 838 (1951). By this method recombination velocities as low as a few hundred centimeters per second can be obtained.

For the purposes of the invention, further, the illuminated strip 14 is made to approximate an infinitely long mathematical line of hole generation. The region over which hole-electron pairs are generated is actually a thin, narrow rectangular parallelopiped of length $l$, width $w$ and depth $d$, as depicted in Fig. 3. If the ratios of both $w$ and $d$ to the minimum separation $r$ are made much less than unity then one may assume that the origin of the holes is a line extending down the middle of the strip 14. If these ratios are kept below about one-fifth a good approximation can be had. Similarly, if the length $l$ is greater than about five times the maximum separator $r$ an infinitely long line is adequately approximated.

If now $r$ is varied over a range of values, the measured voltage $V$ across resistor 11 due to the diffusing holes may be found to vary with $r$ in the manner represented, for specific example, by curve A in Fig. 6. In the latter, the logarithm of the ratio of $V$ to the measured voltage $V_0$ at an arbitrarily selected reference value of $r$ is plotted against $r$. In the curve A so plotted the portion to the left, corresponding to small values of $r$, is not of present significance for it reflects distortion of the flow due to the collector point field and the finite width of the illuminated area. This last effect of finite line width was discussed above. Consider now the distortion resulting from the collector field. This distortion is negligible for values of $r$ greater than about $$\frac{20\rho I}{\pi}$$

where $\rho$ is the resistivity (in ohm-centimeters) of the semiconducting material and $I$ is the steady biasing current (in amperes) flowing through the collector. This limiting value of $r$ is about 0.012 inch in a representative case where the resistivity is 5 ohm-centimeters and the collector current 1 milliampere.

Excepting for the above-identified portion, at sufficiently large values of $r$, the slope $m$ of the curve A, indicated by curve T, is substantially uniform. We have found that the slope $m$ affords a sensitive index to the intrinsic lifetime $\tau_p$ of the test piece, as will be evident from Fig. 6 where curves are shown for test pieces having various intrinsic lifetimes. Thus, curve A applies to a test piece that was found by prior art methods to have a $\tau_p$ of 200 microseconds and curves B, C, D and E indicate the corresponding variations for test pieces having $\tau_p$ values of 5, 10, 50 and 400 microseconds, respectively.

In the practice of the invention, therefore, the slope of the measured characteristic of any particular test piece may be compared with the corresponding slopes of a number of "standard" pieces measured in the same way and under the same conditions. The standard pieces may have known values of $\tau_p$, in which case $\tau_p$ for the particular test piece may be determined by interpolation.

Alternatively one may compare the measured characteristic of the test piece, plotted as in Fig. 6, with a family of similar plots, for different values of the diffusion length, or life path, $L_p$, of the zero order Hankel function of pure imaginary argument $p(r)$ as follows:

$$p(r) = p_0 i H_0^{(1)}(ir/L_p)$$

where $p_0$ is a constant corresponding to the value of $p$ at some arbitrary fixed value of $r=r_0$. The measured curve A in Fig. 6 has a slope, at the larger values of $r$, that is best fitted by the Hankel function curve corresponding to a diffusion length of $L_p = 0.094$ centimeter, the latter being shown at H in Fig. 6. Since $\tau_p = L_p^2/D_p$, where $D_p$ is the appropriate diffusion constant, $\tau_p$ can now be calculated. For example, if the test piece is n-type germanium, as assumed, having a diffusion constant $D_p$ for holes of 44 cm.$^2$/sec. at room temperature, the calculated lifetime is 200 microseconds. If the measured data pertained instead to p-type germanium having a diffusion constant $D_p$ of 92 cm.$^2$/sec. the calculated lifetime would be 96 microseconds. It should be appreciated that no significance is to be attached to the vertical fit of the curves A and H in Fig. 6 inasmuch as both curves are essentially plots of ratios.

The alternative method last described can readily be extended to cases in which the line width $w$ is not negligible by integrating the expression for $p(r)$ over the width $w$ and using the resultant in lieu of curve H.

The significance of surface recombination velocity, and its reduction, in the practice of the present invention can now be examined more critically and better understood. In the limiting case, the surface recombination velocity $s$ would be equal to the radial, or volume, diffusion velocity, the latter being given to a good approximation by $D/L = \sqrt{D/\tau}$. For the purposes of the invention the value of $D/s^2$ should be made substantially larger than the values of $\tau_p$ to be measured. Useful results may be obtained if $D/s^2$ is only twice $\tau_p$ but if $D/s^2$ is made at least four times $\tau_p$ a much higher degree of accuracy can be achieved. Suppose, for specific example, that the test pieces are of n-type germanium for which $D$ is 44 cm.$^2$/sec. and that $\tau_p$ is of the order of 150 microseconds. If the surfaces are treated to reduce $s$ to about 200 cm./sec., $D/s^2$ will be about 1100 microseconds or about seven times $\tau_p$, and this will permit accurate measurements to be obtained over a considerable range of values of $\tau_p$.

Further, as $D/s^2$ is progressively reduced below $\tau_p$, the plotted curve A exhibits a concave-downward curvature, even for the larger values of $r$, that makes it difficult to fit it to a Hankel function curve such as H. In such cases, it is best to compare the data to curves obtained in the same manner on standard pieces whose lifetime has been determined by other methods; see, for example, J. R. Haynes and W. Shockley, Phys. Rev., vol. 75, page 691 (1949).

Temperature changes affect the measurements in about the same degree as they affect the diffusion constant of the material, but they may be disregarded in practice if the equipment and test pieces are maintained at constant temperature, for example, room temperature.

Figure 5:
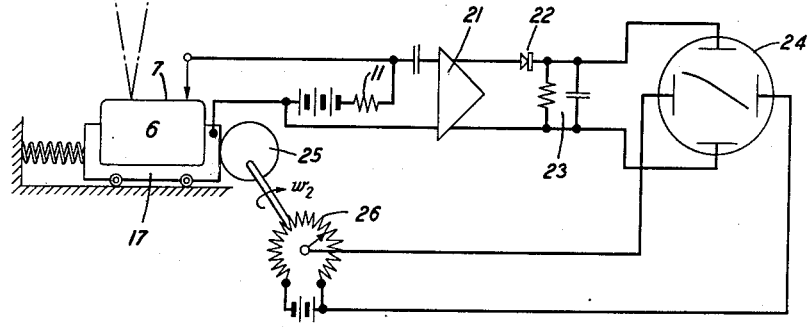
Fig. 5 illustrates an alternative arrangement.
Figure 5:
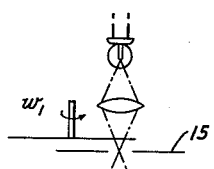

Fig. 5 illustrates a mechanism in accordance with the invention which operates to display the significant characteristic of the test piece on the screen of a cathode ray oscilloscope. In this case the alternating current voltage appearing across resistor 11 is passed through a logarithmic amplifier 21 to a linear rectifier 22 that is followed by a low-pass filter 23. The latter has a cut-off frequency $f_c$ such that $\omega_2 < f_c < \omega_1$, where $\omega_1$ is the light-chopping frequency, $\omega_2$ is the carriage-moving frequency, and $\omega_2 \ll \omega_1$. The rectified output of filter 23, fluctuating with the movement of carriage 17, is applied to the pair of deflecting plates of a cathode ray tube 24 that controls deflection in the vertical plane, while to the other pair of deflecting plates is applied a sweep voltage wave that is synchronized with cyclical movement of the light beam across surface 7. The latter movement may be effected, as illustrated diagrammatically, by a rotating cam 25 that displaces the carriage 17 in one direction against a spring that returns the carriage and keeps it in contact with the cam. Mechanically linked with the cam is the rotatable arm of a potential divider 26 which supplies to the other pair of deflecting plates a sweep voltage that varies linearly with the displacement of the carriage from one of its extreme positions. The screen of the cathode ray tube may be of the long persistence type, and the frequency of the sweep wave, and of the movement of the carriage, may be as low as desired as long as a readable trace is obtained on the screen, e. g. 5 to 10 cycles per second.

The horizontal dimension of the screen has the sense of a linear scale of distance $r$. Since the output voltage of amplifier 21 varies as the logarithm of its input voltage, the vertical dimension of the screen has the sense of a logarithmic scale of voltage. In operation, therefore, there appears on the screen a curve that is of the same character as curve A of Fig. 6. The slope of the curve so appearing varies from one test piece to another in correlation with the variations in intrinsic lifetime. Calibrating lines, corresponding to the curves B, C, D etc. of Fig. 6, may be marked on the screen to facilitate determination of relative lifetime and of absolute lifetime also if desired.

What is claimed is:

1. The method of comparing bodies of semiconductive material with respect to intrinsic lifetime which comprises forming a smooth surface on each of said bodies, treating said surfaces alike to reduce substantially the recombination velocities thereof, directing a beam of radiant energy on each said surface to generate mobile charge carriers in a strip-like portion thereof, detecting the concentration diffusing mobile charge carriers in each said body at a fixed place on said surface separated from said strip-like portion by an extended, substantially field-free region, concurrently varying the separation of said strip-like portion from said fixed place while maintaining each said body at substantially the same predetermined temperature, and indicating the rate at which said detected concentration varies with said variation in separation.

2. The method of comparing bodies of semiconductive material with respect to intrinsic lifetime of mobile charge carriers which comprises forming a smooth surface on each of said bodies, treating said surfaces alike to provide a surface recombination velocity that is small compared to the diffusion velocity, illuminating each of said surfaces at a distance from a fixed reference point thereon, selectively detecting the density at said reference points of the mobile charge carriers generated in said bodies by the illumination of said treated surfaces and diffusing to said reference points, and determining the relative rates of change in the detected density with variation of said distance while maintaining said bodies at the same temperature.

3. The method of testing bodies of semiconductive material with respect to relative intrinsic lifetime of mobile charge carriers which comprises forming a smooth surface on each of said bodies, treating each of said surfaces alike to reduce the recombination velocities thereof to a value $s$ such that $D/s^2$ is substantially greater than the range of intrinsic lifetimes of said bodies, where $D$ is the diffusion constant applicable to said carriers, directing a beam of light against each said surface to illuminate a portion thereof, measuring at substantially the same temperature the concentration of said carriers in each said body at a fixed place on said surface separated from said illuminated portion and to which place said carriers are free to move substantially solely by diffusion, and varying the separation of said illuminated portion from said fixed place concurrently with said measurement of concentration.

4. A device for testing bodies of semiconductive material with respect to intrinsic lifetime comprising a receptacle for holding the body to be tested, a collector electrode positioned to make contact with an exposed surface of said body at a fixed place thereon, a second electrode positioned to make contact with another surface of said body, means for illuminating a portion of the said surface to release mobile charge carriers in the material, means for varying cyclically the separation of said illuminated portion from said fixed place, an electrical indicator connected to said electrodes, and a logarithmic transducer electrically interposed in the connection between said electrodes and said indicator.

5. A device of the kind described comprising means for holding a body of semiconductive material to be tested, means to direct a beam of light, modulated at a first cyclical rate, to illuminate a strip-like portion of a surface of the body so held, a collector electrode adapted to make contact with said surface at a fixed point thereon, means to vary the position of said illuminated portion relative to said fixed point at a second cyclical rate substantially lower than said first cyclical rate, a second electrode adapted to make contact with said body, an electrical circuit including a current source connecting said electrodes, a logarithmic transducer the input of which is connected to receive electrical variations from said circuit, and in circuit sequence following said transducer a rectifier, filter means to remove variations at said first cyclical rate from the output current of said rectifier, and an indicator.

6. A device in accordance with claim 5 comprising a cathode ray tube and a sweep voltage source synchronized with said cyclical variation of position, said cathode ray tube comprising a first ray deflector operatively connected to the output of said filter means and a second ray deflector operatively connected to said sweep voltage source.

7. The method of testing bodies of a semiconductive material selected from the class consisting of germanium and silicon with respect to relative intrinsic lifetime of mobile charge carriers, which comprises: forming on said bodies respective smooth surfaces, treating said surfaces alike to impart a surface recombination velocity $s$ such that $D/s^2$ differs by at least several fold from the range of intrinsic lifetimes of said bodies, where $D$ is the diffusion constant applicable to said carriers, directing a beam of radiant electromagnetic energy against a portion of each said surface to generate mobile charge carriers in the body, measuring at substantially the same temperature the concentration of carriers in each said body at a fixed place on said surface separated from said surface portion by a substantially field-free region, and, concurrently with said measurement of concentration, varying the position of said beam to vary the extent of said separation.

8. The method of testing, for relative intrinsic lifetime of mobile charge carriers, masses of semiconductive material whose dimensions are all of the order of centimeters which method comprises forming a smooth face on each said mass, treating said smooth faces alike to reduce the recombination velocities thereof to a value $s$ such that $D/s^2$ is several times less than the range of intrinsic lifetimes of said masses, where $D$ is the diffusion constant applicable to said carriers, to said carriers, directing a beam of radiant energy to impinge on a portion of each said face that overlies a substantially field-free region in the mass and that is remote from other surfaces thereof whereby said impinging beam generates mobile charge carriers that are free to diffuse uniformly in a pattern dependent substantially only on intrinsic characteristics of the material and said face, measuring at substantially the same temperature the concentration of said diffusing generated carriers in each said mass at a fixed place on said face, and concurrently with the measurement of concentration shifting the place of impingement of said beam, within said face portion, relative to said fixed place, whereby the relative intrinsic lifetimes characteristic of said masses is readily determinable from the respective variations in measured concentration with the separation of said fixed and shifting places.

9. In the fabrication of semiconductor translating devices from ingots of material selected from the class consisting of germanium and silicon, the method of comparison testing said ingots with respect to intrinsic lifetime of mobile charge carriers which comprises forming on each said ingot a smooth flat surface, treating said surfaces alike to impart a surface recombination velocity $s$ such that $D/s^2$ differs by at least several fold from the range of intrinsic lifetimes of said bodies, where $D$ is the diffusion constant applicable to said carriers, directing a beam of light of periodically varying intensity against each said surface to generate mobile charge carriers in a body portion of the same linear strip-like shape, selectively measuring at the same temperature the relative concentration of said light-generated carriers in each said body at a fixed place on said surface to one side of said linear strip-like portion and separated therefrom by an extended substantially field-free region, and, concurrently with said measurement of concentration, shifting the position of said beam and of said strip-like portion within said substantially field-free region to vary the extent of said separation, whereby the relative intrinsic lifetimes characteristic of said ingots are uniquely correlated with the respective rates of variation of measured concentration with separation.

References Cited in the file of this patent

Article by T. W. Case in Physical Review, Series II, vol. IX, 1917, pages 305–309.

"High Frequency Operation of Transistors," by C. B. Brown, Electronics, July 1950, vol. 23, pages 81–83.

"The Phototransistor," by J. N. Shive. Bell Laboratories Record, August 1950, pp. 337–342.